March 7, 1961  W. WILLIS ET AL  2,974,218
WELDING MACHINE

Filed Aug. 19, 1959  4 Sheets-Sheet 1

INVENTOR
WILLIAM WILLIS ET AL
BY Mawhinney & Mawhinney

March 7, 1961 W. WILLIS ET AL 2,974,218
WELDING MACHINE

Filed Aug. 19, 1959 4 Sheets-Sheet 3

INVENTOR
WILLIAM WILLIS ET AL
BY Mawhinney & Mawhinney
ATTYS

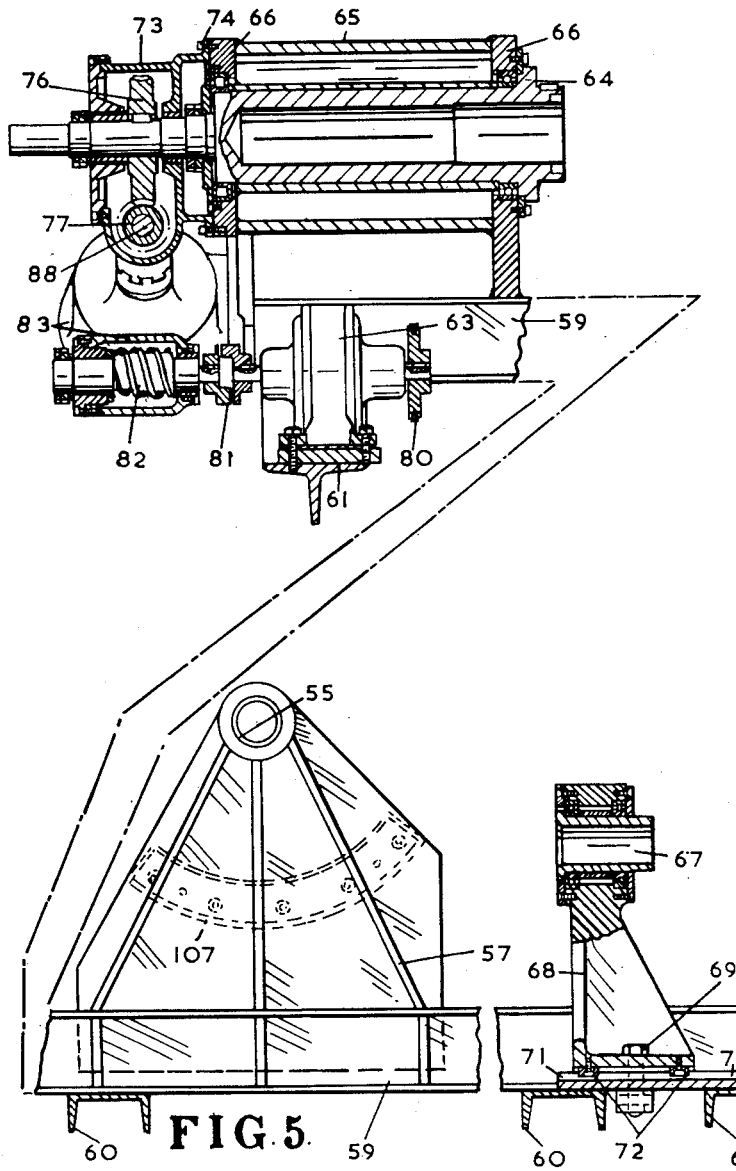

United States Patent Office 2,974,218
Patented Mar. 7, 1961

2,974,218
WELDING MACHINE

William Willis, Wolvey Heath, near Hinckley, Peter J. C. Gough, Nuneaton, and Bernard V. Davis, Willoughby, near Rugby, England, assignors to Bristol Siddeley Engines Limited, Bristol, England Filed Aug. 19, 1959, Ser. No. 834,789

Claims priority, application Great Britain Aug. 30, 1958

5 Claims. (Cl. 219—125)

The invention relates to a machine for welding together, in side-by-side relationship, a pair of elongated elements having portions which are identically curved in the longitudinal direction, and whilst not limited in this respect the invention is particular concerned with a machine for welding together a circular arrangement of a plurality of substantially flat-walled tubes to form a jacketed combustion chamber of a circular cross-section which has different diameters in different axial positions. In such a case it has hitherto been necessary for the tubes to be hand-welded with the resultant incidence of high labour charges, and the main object of the invention, which is also applicable to simpler types of work (e.g., for welding the meeting edges of two transversely-curved sheets), is to enable such a combustion chamber to be built up from the tubes more economically.

According to the invention, a machine, for welding together, in side-by-side relationship, a pair of elongated elements having portions which are identically curved in the longitudinal direction, includes a traversable welding head of a kind equipped with means for automatically adjusting the length of the welding arc, and a holder, for the elements, which is pivotally supported on an axis at right-angles to the direction of traverse of the head, and which is tiltable about the said axis for maintaining the elements and welding head in a favourable relative angular attitude at all positions of the head along its line of traverse, for the welding to be satisfactorily effected. In this way the region of the two elements being operated on by the welding head at any point in its traverse can be properly presented to the arc, for example, for reducing a tendency for the metal melted by the arc from leaving its proper vicinity under the influence of gravity.

It can be arranged for the holder to be manually tiltable about the said axis, but according to a further feature of the invention the traverse movement of the welding head is employed to actuate means for automatically tilting the holder to obtain the said angular attitude throughout the said traverse movement. Thus, the welding head, or a part moving with it, can be arranged, for example, sequentially to actuate a series of micro-switches which are arranged longitudinally of a traverse guide and connected to energize a reversible electric motor for driving it in an appropriate direction, the motor shaft being connected through a reduction gearing to tilt the holder in the appropriate direction in sympathy with the curvature of the elements at the position the welding head has reached in its traverse.

According to yet another feature, and in the case where the machine is for use in welding together in side-by-side relationship a plurality of elongated elements which have portions identically curved in the longitudinal direction and which are arranged in a circle for the formation of a body of varying circular cross-sections in different axial positions, the holder is provided with end-supports, for the circular arrangement of elements, which can be rotated about the axis of the body to be formed for bringing different circumferential parts of the said arrangement into the welding position.

In such a case the machine can be used firstly for tack-welding the elements together adjacent the ends of the circular arrangement, and in other suitable positions, by rotating the aforesaid end-supports in appropriate steps, and then for seam-welding them together along their abutting edges by traversing the welding head and appropriately tilting the holder. Conveniently, and so as to avoid undesirable local heating, the tack-welding is effected between circumferentially spaced pairs of the elements until all of them have been interconnected.

Preferably the various operations of the machine are effected by electrically operated means, and the whole cycle of operations is made automatic by use of a commutator device which is driven from the machine and energises the individual circuits in an appropriate sequence.

One embodiment of the machine, for welding together a circular arrangement of substantially flat-walled tubes to form a jacketed combustion chamber of circular cross-section having different diameters in different axial positions, is illustrated by the accompanying drawings, in which:

Figure 5 is a vertical, longitudinal section in the plane indicated by line 5—5 of Figure 3 through the holder which, for convenience, is shown broken away in two positions with the axes of the three parts indicated by zig-zag lines.

Figure 1:
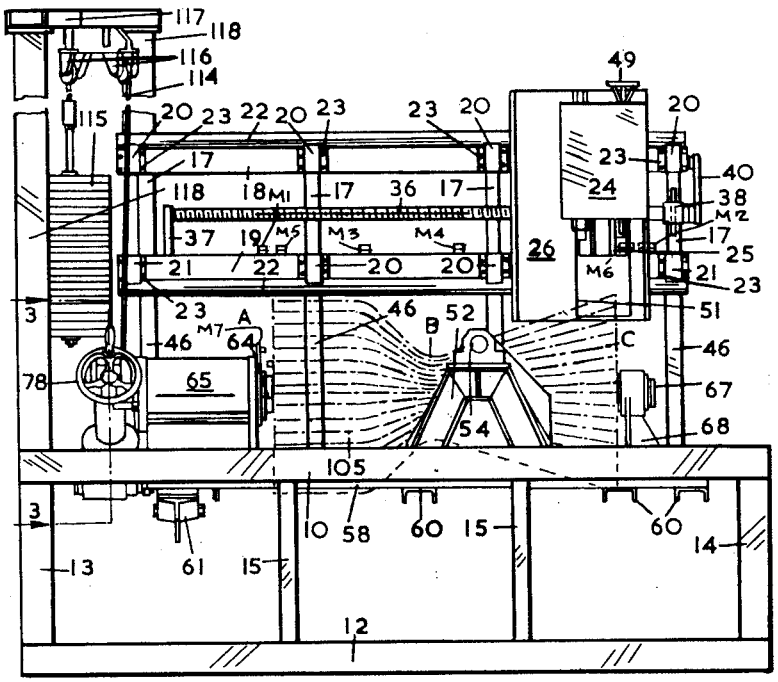
Figure 1 is a front elevation showing, in chain-lines, an assembly of flat-walled tubes supported for being welded to form the combustion chamber.

The machine includes a framework comprising a box-like bed on which the holder is tiltably supported, and an upright support for the welding head and its traverse guide.

The box-like bed includes front and rear upper longitudinal members 10 and 11, front and rear lower longitudinal members of which the front one is shown at 12, end uprights 13, 14 at the front and rear, front and rear intermediate uprights 15, and transverse bottom members 16.

The upright support for the welding head and its traverse guide includes the four uprights 17 shown which are interconnected by upper and lower horizontal members 18 and 19 having secured to their respective front faces a plurality of axially-spaced mounting blocks 20, 21 for supporting guide rails 22 of circular cross-section. The mounting blocks have lateral flanges 23 with holes for screws for securing them to the respective members 18 and 19. As shown, the mounting blocks have V-grooves in which the guide rails seat and are welded, and the guide rails are at the remote sides of the members 18 and 19.

The welding head 24, of known construction, is mounted as hereinafter described from a bracket 25 secured to a back plate 26 having rearwardly-directed, horizontal lips 27 and 28 at the top and bottom. The bottom lip assists in positioning a laterally-spaced pair of roller-supporting blocks (one of which is seen at 29 in Figure 2) which are secured to it by screws 29a. Screws 31 extending through vertical slots in the back plate 26, hold a pair of laterally-spaced upper roller-supporting blocks (one of which is seen at 32 in Figure 2) in position, and screws 33 are provided for adjusting the spacing between each upper block 32 and the coacting lower block 29 with which it is vertically aligned. Each block 29 and 32 rotatively supports a pair of rollers 34 on oppositely inclined axes so that the respective pairs of rollers engage the guide rails 22 at opposite angles to prevent tipping of the back plate.

Figure 2:
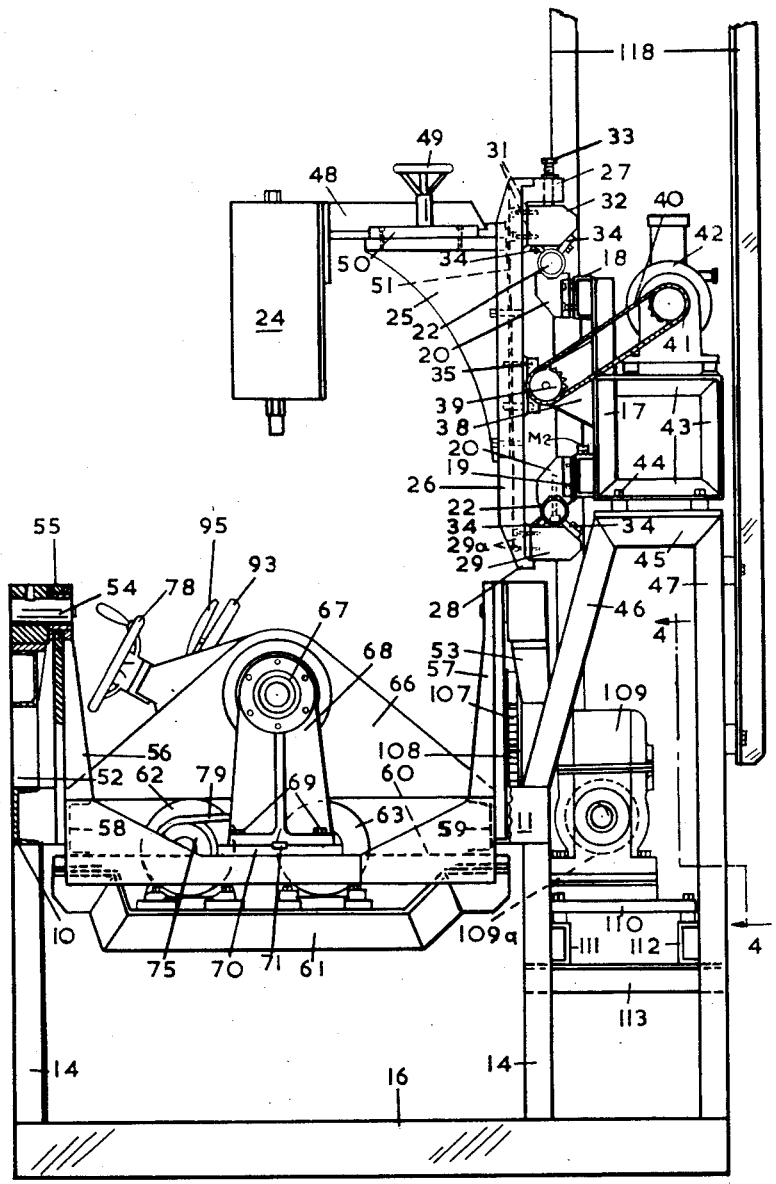
Figure 2 is an end elevation, partly in section and to a larger scale, from the right of Figure 1 but omitting the assembly of tubes.
Figure 3:
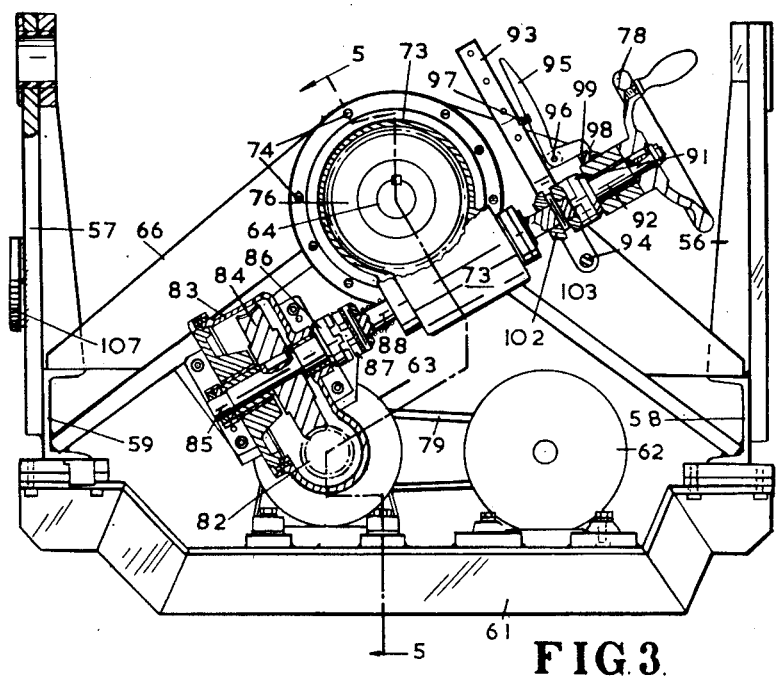
Figure 3 is a section to a still larger scale, on the line 3—3 of Figure 1, through driving arrangements for a tiltable holder for the assembly of tubes, a trunnion bearing in another plane also being shown in section.

Fast with the back of the back plate 26 is a bracket 35 in which is located a nut (not shown) engaged with a traverse screw 36 of which one end is journalled with axial location in a bracket 37 fast with the left-hand end of horizontal member 19 in Figure 1. The opposite end of the traverse screw is journalled in a bracket 38 mounted from the adjacent upright 17, and at its extending end it carries a sprocket 39 which is adapted to be driven through a transmission chain 40 from a sprocket 41 on the shaft of a reversible electric motor 42. The latter, as shown in Figure 2, is supported on the top of a box-like structure 43 which is fast with the adjacent upright 17 and is bolted at 44 to the top of a sub-platform 45 having pairs of supporting legs 46 and 47 forming part of the framework.

The welding head is fast with a slide 48 which can be locked by a screw-operated device 49 in an adjusted position along a coacting guide 50, whereby the position of the welding head can be adjusted in the direction from front to back of the machine, and the bracket 25 is supported from the back-plate so as to be vertically adjustable in ways 51.

It will be seen that when the motor 42 is running the screw 36 and coacting nut will traverse the said head along the guide rails 22 in a direction dependent upon that in which the said motor is driven.

Intermediate their ends the upper longitudinal members 10 and 11 of the framework support a pair of pedestals 52, 53 with aligned trunnions 54 for engagement in bearings 55 mounted in the upper ends of depending arms 56, 57 of a holder for the work. These arms are respectively fast with front and rear longitudinal members 58, 59 of the holder which are interconnected at intervals by transverse members 60. At the left-hand end of Figure 1 the members 58 and 59 are interconnected by a cradle-like transverse member 61 on which are mounted a reversible electric motor 62 and a reduction gearing 63 (presently to be described) through which is adapted to be driven the spindle 64 of a head-stock 65.

The head-stock body is fast with spaced end supports 66 supported by the members 58 and 59, and at the opposite end of the latter a tail-stock 67 is rotatably supported in bearings in a pedestal 68 which is bolted, as shown at 69 in Figure 2, to a bed plate 70 supported from two adjacent transverse members 60 of the holder. The bed plate is provided with a longitudinal slot 71 with which coact the heads of screwed members 72 attached to the underside of the pedestal so that the tail-stock can be adjusted longitudinally and be locked by the bolts 69 at a desired distance from the head-stock.

A reduction gear casing 73 is secured to the rear end support 66 of the head-stock body by screws 74, and the casing contains a worm wheel 76 fast with the head-stock spindle 64 which is rotatably supported in bearings in the end supports 66. The worm wheel is meshed by a worm 77 which is adapted to be driven either manually from a crank handle 78 or from the electric motor 62 and reduction gearing 63.

The electric motor 62 has a pulley 75 on its shaft which drives, through a transmission belt 79, a pulley 80 fast with the input shaft of the reduction gearing 63. The output shaft of the latter is connected by a dog clutch 81 to drive a worm 82 in a casing 83 bolted to the rear end support 66, this worm meshing a worm wheel 84 fast with a shaft 85 journalled in the said casing. The shaft 85 has an extending end provided with a dog-clutch member 86 which is normally disengaged from a coacting dog-clutch member 87 fast on the adjacent end of an aligned shaft 88. This shaft has a slidable, keyed connection 89 with the worm 77, which is journalled at both ends in the casing 73, and at its other end the shaft 88 has a dog-clutch member 90 which is adapted to engage a coacting dog-clutch member 91 fast with an aligned stub-shaft 92 of the crank handle 78.

Figure 6:
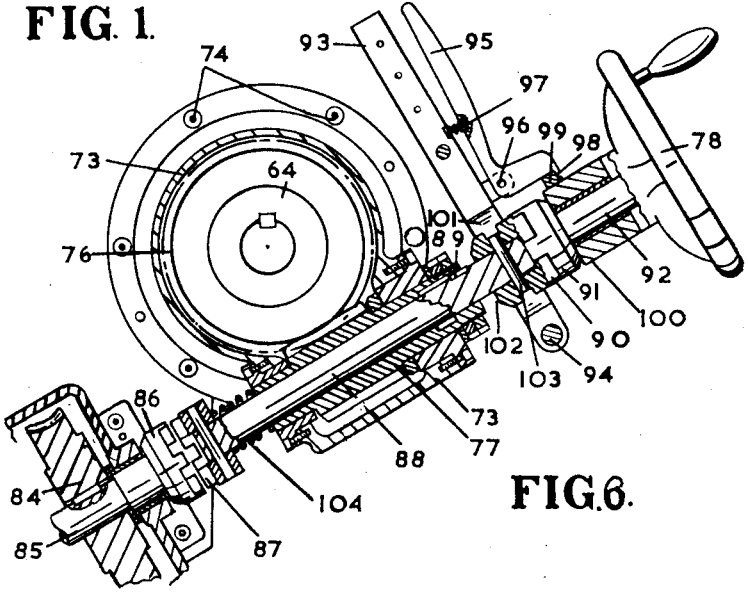
Figure 6 is an enlarged sectional detail view of a manual drive shown in Figure 3.

A shift lever 93, pivoted at 94 from stationary structure, has a detent lever 95 pivoted to it at 96, and a spring 97 reacting between these levers is shown in Figure 6 as biasing a detent 98 to engage behind an abutment 99 which is fast on a stationary boss 100 in which the crank handle shaft 92 is journalled. The shift lever has a fork 101 which engages in a peripheral groove of a ring 102 which is secured by a through pin 103 to the shaft 88, and in the position shown in Figure 6 the detent and abutment are holding the shaft 88, against the action of a spring 104, in a longitudinally slid position in which the dog-clutch 90, 91 is engaged, and dog-clutch 86, 87 is disengaged, such that rotation of the crank handle will drive worm 77 to rotate the head-stock spindle 64 in either direction. On release of the detent from the abutment, spring 104, which reacts between dog-clutch member 87 and the adjacent end of the worm, will move shaft 88 to engage dog-clutch 86, 87 and disengage dog-clutch 90, 91 so as to disconnect the manual drive for the worm 77 and to connect the latter to be driven from the electric-motor-driven shaft 85 of the reduction gearing.

Figure 1 indicates in chain lines at 105 an assembly of flat-walled tubes on a former, not shown, supported between the head-stock and tail-stock, and it will be seen that the said assembly can be rotated in either direction about the common axis of the head-stock and tail-stock either manually or by a drive derived from electric motor 62.

Figure 4:
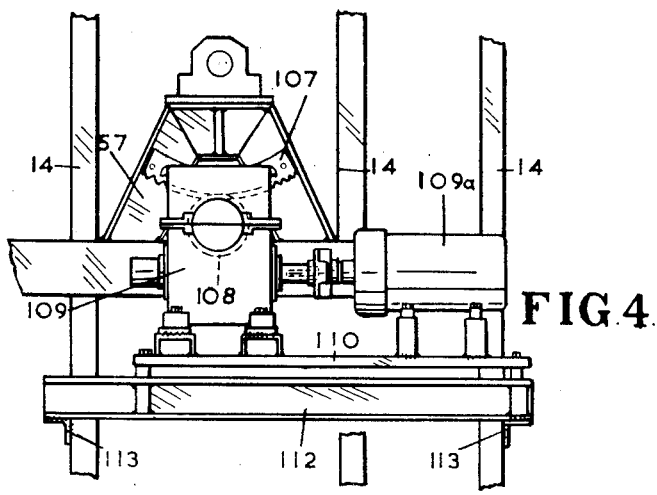
Figure 4 is a view to a different scale in the direction of the arrows 4—4 of Figure 2 of the tiltable holder, the view being from the back of the machine.

For tilting the holder about the trunnion axis a toothed quadrant 107 is made fast with the depending arm 57, and this quadrant is meshed by a pinion 108 on the output shaft of a reduction gearing 109 driven from a reversible electric motor 109a supported from the framework. The support for the motor 109a and reduction gearing (see Figures 2 and 4) comprises a platform 110 bolted on top of a pair of frame members 111, 112 which, in turn, are secured to a pair of spaced frame members (one only of which is seen at 113) made fast with uprights 14 and 47. By driving the motor 109a in the appropriate direction either end of the holder can be raised and the other lowered.

The position of the trunnions 55, and their bearings 54, longitudinally of the combustion chamber to be welded is dictated by the longitudinal curvature of the individual elements. The assembly of flat-walled tubular elements indicated in Figure 1 is for the making of a combustion chamber having a substantially cylindrical end portion A, an intermediate throat portion B and a divergent nozzle portion C, and it is necessary that the said trunnions and bearings should be in the vicinity of the throat portion. As can be seen from Figure 1 this will result in unequal weight distribution of the holder and work at opposite sides of the trunnion axis, and for counter balancing purposes the heavier end of the holder is connected by a cable 114 to a counter weight 115. The cable is rove around pulleys 116 supported from a cross-piece 117 at the tops of frame members 118, and is connected to the holder after being passed around fair lead pulleys (not shown) for applying the counter balancing effort in the appropriate direction.

The welding head used, as previously mentioned, is one of a known kind which is equipped with means for automatically trimming the spacing of the welding electrode from the work, for example, by including the welding arc resistance in a bridge circuit of which the out-ofbalance current is arranged to drive an electric motor, connected to advance or withdraw the electrode, in the direction and to the extent of the out-of-balance current.

Along a part fast with the upright supporting part of the framework are a plurality of micro-switches appropriately arranged in circuits for starting and stopping the electric motors for tilting and rotating the holder and for controlling their directions of operation. Thus, in Figure 1 the horizontal member 19 is shown supporting microswitches M1 and M2 to be operated respectively by a part moving with the back plate 26 for reversing the direction of operation of electric motor 42 when the welding head reaches its opposite limits of traverse, and two further micro-switches M3 and M4 to be respectively operated for driving the electric motor 109a in either direction. In addition to these there are shown two further microswitches M5 and M6 to be actuated by a part moving with the said back plate for starting electric motor 62, and the head stock 65 is shown supporting yet another microswitch M7 which is to be operated by a member fast with the former for opening the circuit of motor 62 when a fresh pair of elements has been brought into the welding position.

In operating the machine for welding elements to form a combustion chamber having an intermediate throat portion, as aforesaid, the elements are first bound to a former and then set up between the head-stock and tailstock. Next, with the welding head adjacent one end of its traverse, the head-stock is rotated step-by-step to bring every $n^{th}$ pair of elements to the welding position to be tack-welded together, the value of "$n$" not being an aliquot factor of the total number of elements so that all will be tack-welded after an appropriate number of revolutions of the head-stock. The latter can be rotated either by the manual drive or by appropriately energising and de-energising the electric motor 62 so as to bring the next pair of elements to be welded to the welding position, to allow them to remain in that position whilst the welding is effected, and so on until a circle of tack-welds interconnects all of the elements. This tack-welding procedure can then be repeated in a position adjacent the opposite ends of the elements, and at one or more intermediate positions if desired.

A variant of this method of tack-welding is to cause the welding head to be advanced slightly each time a fresh pair of elements is moved to the welding position, whereby the line of tack-welds will be helically-arranged; while according to another variant each pair of elements, as it is moved to the welding position is tack-welded at intervals along the length by traversing the welding head, and energising it as each tack-welding position is reached, before the head-stock is rotated to select the next pair of elements to be tack-welded. When, during tack-welding, the welding head is to be traversed that will be done by energising the electric motor 42 and stopping it when the tack-welding position is reached. Obviously, however, any combination of these methods of tack-welding can be employed according to the exigencies of the work in hand.

After the tack-welding has been completed, the electric motor 42 is energised to traverse the welding head from one end of the assembly of elements to the other whereby to seam-weld them together in pairs; and at the end of the traverse the electric motor 62 is energised to select the next pair of elements to be seam-welded, and the electric motor 42 is reversed so as to traverse the welding head back to the starting point until all of the elements have been seam-welded.

During each seam-welding traverse the micro-switches are appropriately operated to start, in the appropriate direction, and stop the electric motor 109a so as to tilt the holder for the elements to be presented in the said favourable angular attitude relatively to the welding head.

As the tack-, and seam-welding operations can be predetermined as to the duration of each individual welding operation, and as to the selection of the pairs of elements to be so treated, the electric circuits involved can be controlled by a commutator-like device of known kind, driven from the machine in any appropriate manner, for causing the operations to be conducted automatically in a planned sequence.

Obviously as it is desirable to stop the electric motors suddenly they are of a dead-beat type (e.g., one in which the armature is biased axially to cause a brake to engage to stop the armature in open-circuit conditions, and having an axially-acting solenoid to move the armature axially to its operative position, and disengage the brake, against the bias when the motor circuit is completed).

What we claim as our invention and desire to secure by Letters Patent of the United States is:

1. A machine, for welding together in side-by-side relationship a plurality of elongated elements which have portions identically curved in the longitudinal direction and which are arranged in a circle for the formation of a body of varying circular cross-section in different axial positions, comprising a framework, guide means supported from said framework, a welding head supported from said guide means to be traversable therealong, a holder, said holder provided with aligned rotatable supports for the elements to be welded together, means for rotating said supports for bringing different adjacent pairs of the elements into the welding station, means pivotally supporting said holder from said framework on an axis which is at right-angles to the direction of traverse of the welding head, and means for tilting said holder about its pivot axis during traversing of the welding head whereby to move those portions of said elements which are in the welding position into an angular position relatively to said welding head favourable to the welding operation.

2. A machine, for welding together in side-by-side relationship a plurality of elongated elements which have portions identically curved in the longitudinal direction and which are arranged in a circle for the formation of a body of varying circular cross-section in different axial positions comprising a framework, guide means supported from said framework, a welding head supported from said guide means to be traversable therealong, drive means for traversing said welding head along said guide means, a first reversible motor connected to drive said drive means, a holder, said holder provided with aligned rotatable supports for the elements to be welded together, a second reversible motor, said second reversible motor mounted from said holder, transmission gearing connecting said second reversible motor for rotating said supports to bring different adjacent pairs of the elements into the welding station, means pivotally supporting said holder from said framework on an axis which is at right-angles to the direction of traverse of the welding head, a third reversible motor, transmission gearing interconnecting said third reversible motor and said holder for tilting said holder about its pivot axis, means actuated by said welding head during its traverse for driving said second reversible motor intermittently to bring fresh pairs of adjacent elements to the welding station, and means actuated by said welding head during its traverse for driving said third reversible motor in the appropriate direction for moving those portions of said elements which are in the welding position into an angular position relatively to said welding head favourable to the welding operation.

3. A machine, for welding together in side-by-side relationship a plurality of elongated elements which have portions identically curved in the longitudinal direction and which are arranged in a circle for the formation of a body of varying circular cross-section in different axial positions, comprising a framework, guide means supported from said framework, a welding head supported from said guide means to be traversable therealong, drive means for traversing said welding head along said guide means, a first reversible electric motor connected to drive said drive means, a holder, said holder provided with aligned rotatable supports for the elements to be welded together, a second reversible electric motor, said second reversible electric motor mounted from said holder, transmission gearing connecting said second reversible electric motor for rotating said supports to bring different adjacent pairs of the elements into the welding station, means pivotally supporting said holder from said framework on an axis which is at right-angles to the direction of traverse of the welding head, a third reversible electric motor, transmission gearing interconnecting said third reversible electric motor and said holder for tilting said holder about its pivot axis, micro switches supported from said guide means to be actuated selectively by means supported from said welding head during its traverse for driving said second reversible electric motor intermittently to bring fresh pairs of adjacent elements to the welding station, and micro switches supported from said guide means to be actuated selectively by means supported from said welding head during its traverse for enabling said third reversible electric motor to be driven in the appropriate direction for moving those portions of said elements which are in the welding position into an angular position relatively to said welding head favourable to the welding operation.

4. A machine, for welding together in side-by-side relationship a plurality of flat-walled tubes which have portions identically curved in the longitudinal direction and which are arranged in a circle for the formation of a jacketed combustion chamber of a circular cross-section and having different diameters in different axial positions, comprising a framework, said framework including a bed portion and an upright portion, horizontal guide means supported from said upright portion of said framework, a welding head supported from said guide means to be traversable therealong, a nut device fast with said welding head, a screw axially located horizontally in said upright portion of said framework, said screw coacting with said nut device, a first reversible electric motor connected to drive said screw for traversing said welding head along said guide means, a holder for the flat-walled tubes to be welded together, a pair of aligned trunnions pivotally supporting said holder from said bed portion of said framework on an axis which is at right-angles to the direction of traverse of the welding head, a head stock and a tail stock supported at opposite ends of said holder, said head stock and said tail stock adapted to support a former on which the circular arrangement of flat-walled tubes are temporarily held in assembled position, a second reversible electric motor, said second reversible electric motor mounted from said holder, a first speed reduction transmission gearing connecting said second reversible electric motor to rotate said head stock whereby to bring different adjacent pairs of the flat-walled tubes into the welding station, a toothed quadrant fast with said holder coaxially with one of said trunnions, a second speed reduction gearing having an output gear wheel meshing said toothed quadrant, a third reversible electric motor connected to drive said second speed reduction gearing for tilting said holder about its pivot axis, micro switches supported from said horizontal guide means to be actuated selectively by means supported from said welding head during its traverse for driving said second reversible electric motor intermittently to bring fresh pairs of adjacent flat-walled tubes to the welding station, and micro switches supported from said horizontal guide means to be actuated selectively by means supported from said welding head during its traverse for enabling said third reversible electric motor to be driven in the appropriate direction for moving those portions of said flat-walled tubes which are in the welding position into an angular position relatively to said welding head favourable to the welding operation.

5. A machine, according to claim 4, additionally including a manually operable drive to the first speed reduction gearing, and a clutch in the drive from the second reversible electric motor to said first speed reduction gearing, said clutch operable from one extreme position in which said second reversible electric motor is connected to drive said first speed reduction gearing and in which the manually operable drive is disconnected, through a neutral position to another extreme position in which said manually operable drive is connected and the drive from said second reversible electric motor is disconnected.

References Cited in the file of this patent

UNITED STATES PATENTS

| | | |
|---|---|---|
| 1,801,140 | Chapman | Apr. 14, 1931 |
| 1,975,578 | Kenney et al. | Oct. 2, 1934 |
| 2,288,032 | Smith | June 30, 1942 |